(12) United States Patent
Chou et al.

(10) Patent No.: US 6,505,151 B1
(45) Date of Patent: Jan. 7, 2003

(54) METHOD FOR DIVIDING SENTENCES INTO PHRASES USING ENTROPY CALCULATIONS OF WORD COMBINATIONS BASED ON ADJACENT WORDS

(75) Inventors: Peilin Chou, Taipei (TW); Yen-Jen Oyang, Taipei Shienn (TW); Kuang-Hua Chen, Taipei Shienn (TW); Tien-Hsiung Sung, Taipei (TW); Chih-Yuan Cheng, Chung Ho (TW)

(73) Assignee: Bridgewell Inc., Taipei (TW)

( * ) Notice: Subject to any disclaimer, the term of this patent is extended or adjusted under 35 U.S.C. 154(b) by 0 days.

(21) Appl. No.: 09/525,692

(22) Filed: Mar. 15, 2000

(51) Int. Cl.$^7$ ............................................... G06F 17/27
(52) U.S. Cl. ............................................................ 704/9
(58) Field of Search .......................... 704/9, 10; 707/3, 707/4, 5, 6, 530, 531, 532, 533; 434/169

(56) References Cited

U.S. PATENT DOCUMENTS

| | | | | | |
|---|---|---|---|---|---|
| 5,724,593 | A | * | 3/1998 | Hargrave, III et al. | 704/7 |
| 5,828,991 | A | * | 10/1998 | Skiena et al. | 704/9 |
| 5,930,746 | A | * | 7/1999 | Ting | 704/9 |
| 5,987,404 | A | * | 11/1999 | Della Pietra et al. | 704/9 |
| 5,991,710 | A | * | 11/1999 | Papineni et al. | 704/2 |
| 6,052,657 | A | * | 4/2000 | Yamron et al. | 704/9 |
| 6,092,034 | A | * | 7/2000 | McCarley et al. | 704/2 |
| 6,131,082 | A | * | 10/2000 | Hargrave, III et al. | 704/7 |

* cited by examiner

Primary Examiner—Patrick N. Edouard
(74) Attorney, Agent, or Firm—Douglas L. Weller

(57) ABSTRACT

The process of dividing sentences into phrases is automated. The sentence is divided into sub-sentences using statistical analysis. Then, the sub-sentences are into phrases, using statistical analysis. For example, for each pair of adjacent words in the sentence a metric is calculated which represents a strength of disconnection between the adjacent words. The sentence is divided into sub-sentences at locations in the sentence where the metric exceeds a first threshold.

10 Claims, 2 Drawing Sheets

METHOD FOR DIVIDING SENTENCES INTO PHRASES USING ENTROPY CALCULATIONS OF WORD COMBINATIONS BASED ON ADJACENT WORDS

BACKGROUND OF THE INVENTION

The present invention relates to databases and pertains particularly to dividing sentences into phrases in preparation for using attributes to organize and access documents.

The collection and use of information is important both for individuals and corporate entities. This is particularly true for certain professions, such as news agencies and publishing companies. In these professions, the collection and management of data is essential.

In early data management systems, data was collected and preserved. Data, when needed, was searched out one article at a time. Such a traditional data management lacks structure, and is not sufficient for modern society which values efficiency and speed.

In more recent years, the use of computers has greatly increased the efficiency of data management. Data management by computer is generally divided into two systems. In one system, data is sorted by index. In the other system, data is sorted using multiple indexes similar to the use of a bibliographical card index.

When sorting by index, a subjective judgment of data is made according to the existing sorting criteria. Based on this subjective judgement, the data is indexed and stored into a corresponding file. When a particular lot of data is desired, a search is performed by index in an attempt to locate the appropriate data.

One drawback of a single index system is that sorting is done manually in reliance upon the subjective judgment of an administrator. Data supposed to be classified under a first category might be misplaced in a second category simply because the administrator failed to recognize the nature of the data. Since any lot of data is generally put under only one particular category only, the lot of data is practically missing if put under another category by mistake. Therefore, it is easy in a single index for data to become lost or difficult to retrieve.

In multiple index systems, multiple indexes are used. For example, separate columns can be used to allow sorting by author, log-in date, log-in publication, topic or serial number. The data can then be retrieved using an index for any column.

However there are also deficiencies with multiple index systems. For example, for any particular lot of data any and all specific columns can fail to satisfy the needs for organization of data. For instance, it may still be difficult to define and classify data used by a news agency or a publishing company. For example, if there are seven co-authors in a given article and the specific column used to index authors allows the entry of at most three authors, then only three of seven co-authors can be used to index the article. The remaining four authors would have to be abandoned in the entry. A later search for the works of these four authors would not turn up this article. Furthermore, the selection of which authors to include in the entry and which to drop requires a subjective judgment.

Key words can be used to index data. For example, to index a target article, keywords can be used such as "Politics", "Related to Crossing the Straits", or "Straits Exchange Foundation". These keywords can be stored with the document or the database system can perform a full text index through all documents in the database searching for a keyword. However, use of keywords for searching lacks accuracy since articles may contain searched key words, but the key words may have different meanings as used in different articles. Thus searching by key word is often not worth the effort.

SUMMARY OF THE INVENTION

In accordance with a preferred embodiment of the present invention, the process of dividing sentences into phrases is automated. The sentence is divided into sub-sentences using statistical analysis. Then, the sub-sentences are into phrases, using statistical analysis.

For example, for each pair of adjacent words in the sentence a metric is calculated which represents a strength of disconnection between the adjacent words. The sentence is divided into sub-sentences at locations in the sentence where the metric exceeds a first threshold.

In the preferred embodiment, the metric is a cutability measure that is calculated as a sum of backward entropy, forward entropy and mutual information.

Forward entropy (FE) of a character $C_I$ which immediately proceeds a character $C_j$ in a sentence is calculated using the following equation:

$$FE(C_i) = -\sum_{C_j} P_F(C_j \mid C_i) \log P_F(C_j \mid C_i)$$

where $P_F(C_j|C_i)$ is the probability of $C_j$ following $C_j$.

Backward entropy (BE) of a character $C_I$ which immediately follows a character $C_j$ in a sentence is calculated using the following equation:

$$BE(C_i) = -\sum_{C_j} P_B(C_j \mid C_i) \log P_B(C_j \mid C_i)$$

where $P_B(C_j|C_i)$ is the probability of $C_j$ being ahead of $C_j$.

Mutual information (MI) of a character $C_i$ that immediately precedes a character $C_j$ in a sentence is calculated using the following equation:

$$MI(C_i, C_j) = \log \frac{P(C_i C_j)}{P(C_i) P(C_j)}$$

where $P(C_i C_j)$ is the probability that $C_j$ exactly comes after $C_i$ where $P(C_i)$ is the probability that any character chosen at random in the corpus is $C_i$, and where $P(C_j)$ is the probability that any character chosen at random in the corpus is $C_j$.

In order to divide a sub-sentence into phrases, for a first word in the sub-sentence, an occurrence, in a corpus, of word combinations of the sub-sentence beginning with the first word is determined. Also, for a word immediately following the first word in the sub-sentence, an occurrence, in the corpus, of word combinations of the sub-sentence beginning with the word immediately following the first word is determined. For the first word in the sub-sentence, a word combination of a first number of words starting with the first word is selected to be used as a phrase when a ratio of the occurrence of the word combination of the first number of words starting with the first word and continuing with adjacent words in the sub-sentence to occurrence of a word combination of the first number of words starting with the word immediately following the first word and continuing with adjacent words in the sub-sentence is greater than that for any but the first number, provided the first number is less than a predetermine threshold.

A next phrase can be determined the same way. Specifically, for a next word in the sub-sentence not included in the word combination of the first number of words starting with the first word, an occurrence, in the corpus, of word combinations of the sub-sentence beginning with the next word is determined. For a word immediately following the next word in the sub-sentence, an occurrence, in the corpus, of word combinations of the sub-sentence beginning with the word immediately following the next word is determined. For the next word, a word combination of a second number of words starting with the next word is selected to be used as a phrase when a ratio of the occurrence of the word combination of the second number of words starting with the next word and continuing with adjacent words in the sub-sentence to occurrence of a word combination of the second number of words starting with the word immediately following the next word and continuing with adjacent words in the sub-sentence is greater than that for any but the second number, provided the second number is less than the predetermine threshold.

This methodology of dividing sub-sentences in phrases can be used to divide any sentence portion into phrases including a sentence portion that includes the entire sentence.

Once sentences have been divided into phrases, these phrases may be checked, if necessary, by a human operator or by some other method such as a syntactic analyzer.

The present invention allows for automated division of sentences into phrases. This can significantly reduce the time and effort needed to generate phrases within a document.

DETAILED DESCRIPTION OF THE INVENTION

Figure 1:
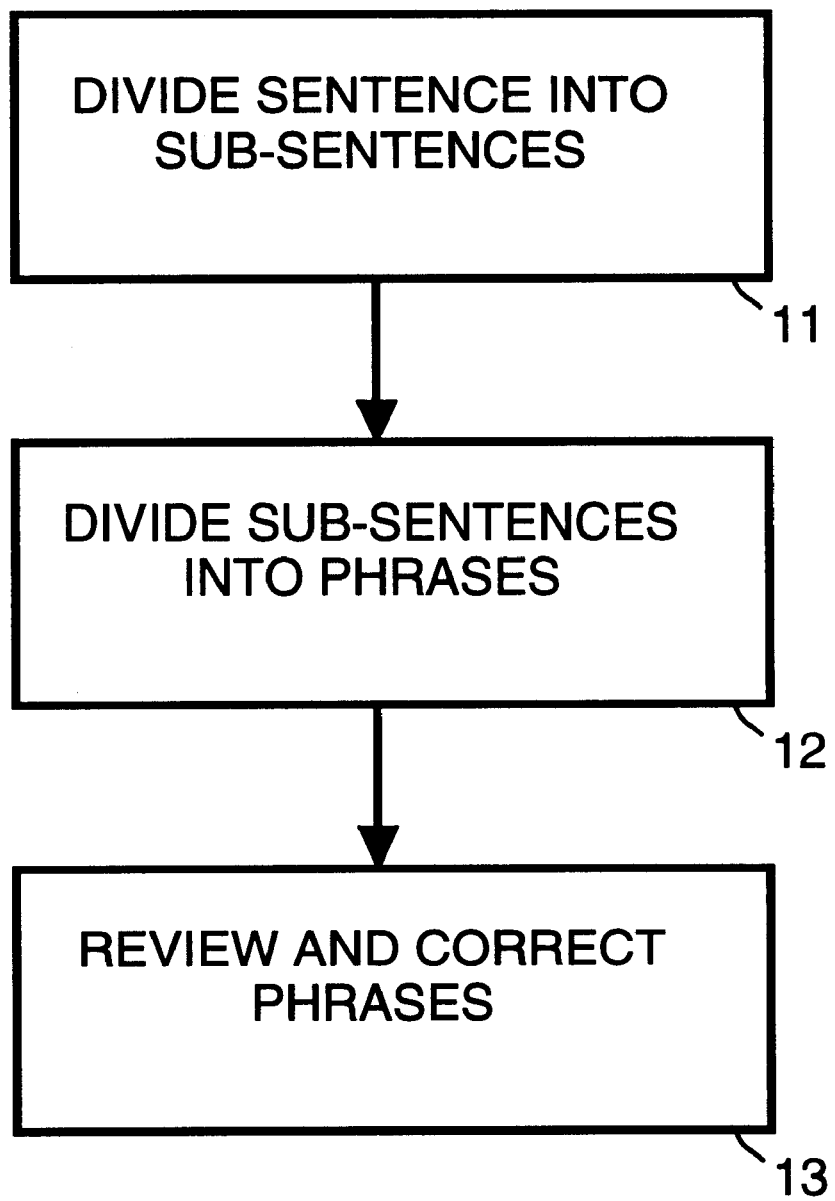
FIG. 1 is a flowchart which illustrates a method for dividing sentences into phrases in accordance with a preferred embodiment of the present invention.

In the English language but particularly in the Chinese language, a single word is not always sufficient to carry a clear meaning. A word with a particular assigned meaning may have a totally different meaning when appearing with a different word. Therefore parsing sentences within a document into phrases with a basic meaning is necessary in order to understand the subject matter addressed by the document. This is useful, for example, when a system uses phrases to automatically assign attributes to a document. An attribute is, for example, a topic addressed within the document.

Thus, in some cases it is desirable to divide a document into phrases, so that a phrase can be uses as a basic processing element.

For example, parsing into phrases can be performed using syntactic analysis. Each part of a sentence can be categorized as verb phrase, noun phrase, adjective phrase, adverbial phrase, proper name etc. In the preferred embodiment of the present invention, however, parsing into phrases is done without the use of syntactic analysis. For example, FIG. 1 sets out a method for performing phrasing of a sentence within a document.

In a step 11, the sentence is divided into sub-sentences. The division is done, however, not with syntactic analysis, but by using statistical processing to decide the breaking points between words (or characters) to make a long sentence become several short sentences, or sub-sentence. A long sentence may be divided into several sub-sentences. A short sentence, however, may be divided into only a single sub-sentence where the sub-sentence is the entire sentence.

For example, Table 1 below sets out a sentence in Chinese:

TABLE 1

| 這次半導體論壇是由經濟部資訊工業推動小組負責籌畫 |
| --- |
| 這次半導體論壇 |
| 是由經濟部資訊工業推動小組 |
| 負責籌畫 |

In Table 1 above, the original sentence, which is underlined, may be transliterated as, "This (time) semiconductor forum is by Minister of Economic Affairs information industry task group responsible for planning and holding"

As shown in Table 1, the sentence is shown broken into three sub-sentences. The first sub-sentence can be transliterated as: "this (time) semiconductor forum". The second sub-sentence can be transliterated as: "is by Minister of Economic Affairs information industry task group". The third sub-sentence can be transliterated as: "responsible for planning and holding".

In order to divide the sentence, a metric called cutability measure (CM) is used. CM represents the strength of disconnection between characters (or words). The concept is similar to use of a pause between certain words when speaking a long sentence. The proper location to pause between words is a high Cutability Measure point.

In the preferred embodiment, CM is defined as the sum of Backward Entropy, Forward Entropy and Mutual Information. Entropy is a metric to measure the degree of disorder in thermodynamics. When we observe the words (characters) patterns in a corpus, for each single word we can find different patterns following this word. We describe these patterns by Forward Entropy (FE). The higher Forward Entropy, the higher disorder of the patterns following the word.

For example, in Table 2 below two Chinese words (characters) are shown. Also shown are all the two character combinations that appear in the corpus that begin with one of the two words. The number in parenthesis indicates the number of times each of the word combinations appears in the corpus.

TABLE 2

| Word 1 國 | 國家(5) | 國民(3) | 國民(2) | 國泰(4) | 國格(2) |
| --- | --- | --- | --- | --- | --- |
| Word 2 頻 | 頻率(2) | 頻覽(2) | | | |

As shown in Table 2, there are five different combinations of characters which begin with word 1. There are only two different combinations of characters which begin with word 2. In this case, it is clear word 1 has higher Forward Entropy than word 2.

In general, forward entropy (FE) is defined by Equation 1 below:

Equation 1

$$FE(C_i) = -\sum_{C_j} P_F(C_j | C_i) \log P_F(C_j | C_i)$$

In Equation 1 above, the probability of $C_j$ following $C_i$ is defined as:

$$P_F(C_j|C_i)$$

Similarly, the higher Backward Entropy, the higher disorder of the patterns ahead of a particular word. For example, in Table 3 below two Chinese words (characters) are shown. Also shown are all the two character combinations that appear in the corpus that end with one of the two words. The number in parenthesis indicates the number of times each of the word combinations appears in the corpus.

TABLE 3

| Word 1 | 壘球(8) | 排球(10) | 足球(14) | 木球(4) | 棒球(12) |
|---|---|---|---|---|---|
| Word 2 馬 | 容易(10) | 不易(2) | | | |

As shown in Table 3, there are five different combinations of characters which end with word 1. There are only two different combinations of characters that end with word 2. In this case, it is clear word 1 has higher Backward Entropy than word 2.

In general, backward entropy (FE) is defined by Equation 2 below:

Equation 2

$$BE(C_i) = -\sum_{C_j} P_B(C_j | C_i) \log P_B(C_j | C_i)$$

In Equation 2 above, the probability of $C_j$ ahead of $C_i$ is defined as:

$$P_B(C_j|C_i)$$

Mutual Information (MI) is a measurement of probability that two words appear in the exact pattern. MI($C_i$, $C_j$) relates to the probability that $C_j$ exactly comes after $C_i$. The higher MI($C_i$, $C_j$), the more probably $C_j$ exactly comes after $C_i$. Equation 3 below gives the exact definition for MI:

Equation 3

$$MI(C_i, C_j) = \log \frac{P(C_i C_j)}{P(C_i)P(C_j)}$$

In equation 3 above: P($C_i C_j$) means the probability that $C_j$ exactly comes after $C_i$; P($C_i$) is the probability that any character chosen at random in the corpus is $C_i$; and, P($C_j$) is the probability that any character chosen at random in the corpus is $C_j$.

Thus the Cutability Measure (CM) between two adjacent words $C_j$ and $C_i$. is defined as in Equation 4 below:

Equation 4

$$CM(C_i,C_j)=FE(C_i)+BE(C_j)-MI(C_i,C_j)$$

If there are N words in a sentence, there are N-1 Cutability Measures calculated. For example, for the sentence shown in Table 1, there are 24 words (characters). Thus there are 23 CM calculated between words.

Figure 2:
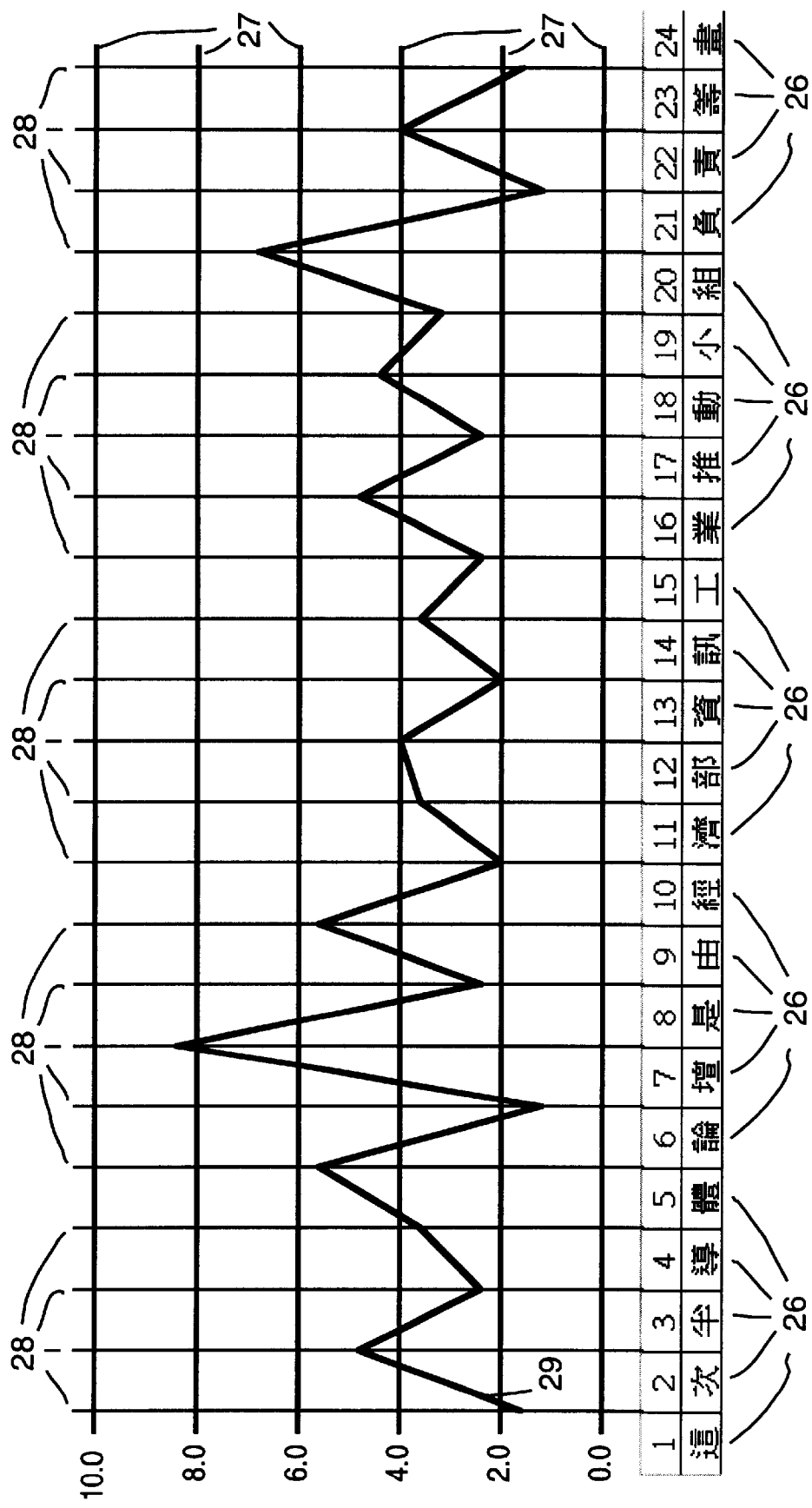
FIG. 2 is a graph that shows a connectivity measure of words within a sentence in accordance with a preferred embodiment of the present invention.

FIG. 2 illustrates the CM for the 24 words shown in Table 1. In FIG. 1, vertical lines 28 are the locations the cutability measure (CM) are measured for the words (characters) in columns 26. Graph 29 shows the cutability values between each word, as set out on horizontal lines 27.

Thus, as shown in FIG. 2, the cutability measure between the first and second words is approximately 1.6. The cutability measure between the second and third words is approximately 4.8. The cutability measure between the third and fourth words is approximately 2.4. The cutability measure between the fourth and fifth words is approximately 3.6. The cutability measure between the fifth and sixth words is approximately 5.6. The cutability measure between the sixth and seventh words is approximately 1.3. The cutability measure between the seventh and eighth words is approximately 8.3. The cutability measure between the eighth and ninth words is approximately 2.3. The cutability measure between the ninth and tenth words is approximately 5.6. The cutability measure between the tenth and eleventh words is approximately 2.0. The cutability measure between the eleventh and twelfth words is approximately 3.7. The cutability measure between the twelfth and thirteenth words is approximately 4.0. The cutability measure between the thirteenth and fourteenth words is approximately 2.0. The cutability measure between the fourteenth and fifteenth words is approximately 3.6. The cutability measure between the fifteenth and sixteenth words is approximately 2.4. The cutability measure between the sixteenth and seventeenth words is approximately 4.7. The cutability measure between the seventeenth and eighteenth words is approximately 2.3. The cutability measure between the eighteenth and nineteenth words is approximately 4.2. The cutability measure between the nineteenth and twentieth words is approximately 3.2. The cutability measure between the twentieth and twenty-first words is approximately 6.4. The cutability measure between the twenty-first and twenty-second words is approximately 1.3. The cutability measure between the twenty-second and twenty third words is approximately 4.0. The cutability measure between the twenty-third and twenty-fourth words is approximately 1.7.

Based on the cutability measure, the sentence is divided into sub-sentences. The exact threshold used at which a sentence is divided can be varied in a way that best fits the particular application. The lower CM threshold, the more sub-sentences for each sentence. In the present example, a CM threshold of 6.0 is chosen resulting in the sentence division shown in Table 1.

In a step 12, the sub-sentences are divided into phrases. For example, in Chinese, most of phrases are 2-word and 3-word patterns. However, sometimes a phrase may consist of four words, five words or even more words.

Statistical analysis is used to divide the words into phrases. For example, in order to divide a seven word sub-sentence into phrases, the statistical occurrence of word combinations within the corpus is used to determine the phrase breaks.

For words where there is less than a predetermined number of words separating the word from the end of the phrase, a "stop character" is added. Like a period or comma, the "stop character" indicates the end of the phrase.

In the present example, the first word occurs 22,484 times: 23 times immediately followed by the second word, four times followed by the second and third words, one time followed by the second, third and fourth words and one time followed by the second, third, fourth and fifth words. The second word occurs 1,778 times: 40 times immediately followed by the third word, twice followed by the third and fourth words, twice followed by the third, fourth and fifth words and one time followed by the third, fourth, fifth and sixth words. The third word occurs 4,483 times: 15 times immediately followed by the fourth word, 15 times followed by the fourth and fifth words, one time followed by the fourth, fifth and sixth words and one time followed by the fourth, fifth words, sixth and seventh words. The fourth word occurs 1,217 times: 515 times immediately followed by the fifth word, twice followed by the fifth and sixth word, twice followed by the fifth, sixth and seventh words and nine times followed by the fifth, sixth and seventh words at the end of the phrase (stop character). The fifth word occurs 3,705 times: nine times immediately followed by the sixth word, nine times followed by the sixth and seventh words and 85 times followed by the sixth and seventh words at the end of the phrase (stop character). The sixth word occurs 1,991 times: 1367 times immediately followed by the seventh word and 232 times immediately followed by the seventh word at the end of the phrase (stop character). The seventh word appears 3,216 times and 647 times at the end of the phrase (stop character). This information is summarized in Table 4 below:

TABLE 4

| Word 1 | Word 2 | Word 3 | Word 4 | Word 5 | Word 6 | Word 7 |
|--------|--------|--------|--------|--------|--------|--------|
| 22,484 | 2,778  | 4,483  | 1,217  | 3,705  | 1,991  | 3,216  |
| 23     | 40     | 15     | 515    | 9      | 1,367  | 647    |
| 4      | 2      | 15     | 2      | 9      | 232    |        |
| 1      | 2      | 1      | 2      | 3      |        |        |
| 1      | 1      | 1      | 1      |        |        |        |

From Table 4, it can be seen that the sub-sentence is likely to be divided into four phrases: word 1, word 2–3, word 4–5, word 6–7. For example, the combination of words 2 and 3 is used 40 times, while the combination of words 2, 3 and 4 is used only 2 times, and the combination of words 3 and 4 is used only 15 times. Therefore the use of words 2 and 3 as a phrase is probably better than the use of the word combination of words 3 and 4 or word combination of words 2, 3 and 4.

Similarly, the word combination of words 4 and 5 is used 515 times, while the word combination of words 4, 5 and 6 is used only 2 times and the word combination of words 5 and 6 is used only nine times. It is clear from this that the word combination of words 4 and 5 is a phrase.

In the preferred embodiment, a design rule is used to automate this phase of phrasing. Starting from the beginning of a sub-sentence, for every adjacent word combination, the n-word combinations of the two words are compared. Specifically, the ratio of the n-word combinations for the two words are calculated, and the n-word combination with the highest ratio is selected as a phrase.

For example, for word 1 and word 2 the ratio of the n-word combinations are calculated as in Table 5 below:

TABLE 5

|                   | Word 1 | Word 2 | Word 1/word 2      |
|-------------------|--------|--------|--------------------|
| 1-word combination | 22,484 | 2,778  | 22,484/2778 = 12.6 |
| 2-word combination | 23     | 40     | 23/40 = 0.5        |
| 3-word combination | 4      | 2      | 4/2 = 2.0          |
| 4-word combination | 1      | 2      | 1/2 = .05          |
| 5-word combination | 1      | 1      | 1/1 = 1            |

From Table 5, it is clear that the highest ratio is 12.6 which is for a one-word combination. Therefore, word 1 is used as a one-word phrase.

For word 2 and word 3 the ratio of the n-word combinations are calculated as in Table 6 below:

TABLE 6

|                   | Word 2 | Word 3 | Word 1/word 2      |
|-------------------|--------|--------|--------------------|
| 1-word combination | 2,778  | 4,483  | 2778/4,483 = 0.4   |
| 2-word combination | 40     | 15     | 40/15 = 2.7        |
| 3-word combination | 2      | 15     | 2/15 = 0.1         |
| 4-word combination | 2      | 1      | 2/1 = 2.0          |
| 5-word combination | 1      | 1      | 1/1 = 1            |

From Table 6, it is clear that the highest ratio is 2.7 which is for a two-word combination. Therefore, word 2 and word 3 are used as a two-word phrase.

For word 4 and word 5 the ratio of the n-word combinations are calculated as in Table 7 below:

TABLE 7

|                   | Word 4 | Word 5 | Word 1/word 2       |
|-------------------|--------|--------|---------------------|
| 1-word combination | 1,217  | 3,705  | 1,217/3,705 = 0.3   |
| 2-word combination | 515    | 9      | 515/9 = 57          |
| 3-word combination | 2      | 9      | 2/9 = 0.2           |
| 4-word combination | 2      | 3      | 2/3 = 0.7           |
| 5-word combination |        |        | . . .               |

From Table 7, it is clear that the highest ratio is 57 which is for a two-word combination. Therefore, word 4 and word 5 are used as a two-word phrase.

For word 6 an d word 7 the ratio of the n-word combinations are calculated as in Table 8 below:

TABLE 8

|                   | Word 6 | Word 7 | Word 1/word 2       |
|-------------------|--------|--------|---------------------|
| 1-word combination | 1,991  | 3,216  | 1,991/3,216 = 0.6   |
| 2-word combination | 1,367  | 647    | 1367/647 = 2.1      |
| 3-word combination |        |        | . . .               |
| 4-word combination |        |        | . . .               |
| 5-word combination |        |        | . . .               |

From Table 8, it is clear that the highest ratio is 2.1 which is for a two-word combination.

So far, parsing into phrases has been performed without using syntactic analysis. The parsing into phrases is dependent solely on the frequency of occurrence of the phrases. This is particularly effective when properly parsing proper names in Chinese. Proper names are difficult to find using syntactic analysis and they are not all listed in a dictionary.

As long as a proper name is used with sufficient frequency in the literature, it is likely that the proper name will be correctly identified as a phrase using the above-described analysis.

Step 11 and step 12 can be completely automated and performed by a computer. In a step 13, the phrases are reviewed and corrected by a human operator. The human operator performs a final check and correction of the phrases.

Once phrase are parsed within a document, attributes are associated with the phrases. What is meant by attribute is a topic that is associated with the phrase.

For example, for the phrase "ambulance" attributes such as "emergency", "car", "accident", "patient", and "rescue" could be generated.

Attributes for each phrase can be generated, for example, by experts, familiar with the corpus. The attributes generated for each phrase can also be assigned weights by the experts or based on statistical occurrence. Documents can then be categorized and searched based on the attributes represented by the phrases therein.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for automating the process of dividing sentences into phrases, comprising the following steps:
   (a) dividing a sentence into sub-sentences using statistical analysis, $$FE(C_i) = -\sum_{C_j} P_F(C_j \mid C_i) \log P_F(C_j \mid C_i)$$

including the following substeps:
   (a.1) for each pair of adjacent words in the sentence calculating a metric which represents a strength of disconnection between the adjacent words, and
   (a.2) breaking the sentence into sub-sentences at locations in the sentence where the metric exceeds a first threshold; and,
   (b) dividing the sub-sentences into phrases, using statistical analysis;
   wherein in substep (a.1), the metric is a cutability measure that is calculated as a sum of backward entropy, forward entropy and mutual information; and,
   wherein in substep (a.1) forward entropy (FE) of a character $C_I$, which immediately proceeds a character $C_j$ in a sentence is calculated using the following equation:
   where $P_F(C_j \mid C_i)$ is the probability of $C_j$ following $C_j$.

2. A method for automating the process of dividing sentences into phrases, comprising the following steps:
   (a) dividing a sentence into sub-sentences using statistical analysis, including the following substeps;
   (a.1) for each pair of adjacent words in the sentence calculating a metric which represents a strength of disconnection between the adjacent words, and
   (a.2) breaking the sentence into sub-sentences at locations in the sentence where the metric exceeds a first threshold; and,
   (b) dividing the sub-sentences into phrases, using statistical analysis;
   wherein in substep (a.1), the metric is a cutability measure that is calculated as a sum of backward entropy, forward entropy and mutual information; and,
   wherein in substep (a.1) backward entropy (BE) of a character $C_I$ which immediately follows a character $C_j$ in a sentence is calculated using the following equation:

$$BE(C_i) = -\sum_{C_j} P_B(C_j \mid C_i) \log P_B(C_j \mid C_i)$$

where $P_B(C_j \mid C_i)$ is the probability of $C_j$ being ahead of $C_j$.

3. A method for automating the process of dividing sentences into phrases, comprising the following steps:
   (a) dividing a sentence into sub-sentences using statistical analysis, including the following substeps:
   (a.1) for each pair of adjacent words in the sentence calculating a metric which represents a strength of disconnection between the adjacent words, and
   (a.2) breaking the sentence into sub-sentences at locations in the sentence where the metric exceeds a first threshold; and,
   (b) dividing the sub-sentences into phrases, using statistical analysis;
   wherein in substep (a.1), the metric is a cutability measure that is calculated as a sum of backward entropy, forward entropy and mutual information; and,
   wherein in substep (a.1) mutual information (MI) of a character $C_I$ which immediately precedes a character $C_j$ in a sentence is calculated using the following equation:

$$MI(C_i, C_j) = \log \frac{P(C_i C_j)}{P(C_i) P(C_j)}$$

where $P(C_i C_j)$ in the probability that $C_j$ exactly comes after $C_i$,
   where $P(C_i)$ is the probability that any character chosen at random in the corpus is $C_i$, and
   where $P(C_j)$ is the probability that any character chosen at random in the corpus is $C_j$.

4. A method for automating the process of dividing sentences into phrases, comprising the following steps:
   (a) dividing a sentence into sub-sentences using statistical analysis; and,
   (b) dividing the sub-sentences into phrases, using statistical analysis, including the following substeps:
   (b.1) for a first word in the sub-sentence, determining an occurrence, in a corpus, of word combinations of the sub-sentence beginning with the first word,
   (b.2) for a word immediately following the first word in the sub-sentence, determining an occurrence, in the corpus, of word combinations of the sub-sentence beginning with the word immediately following the first word, and
   (b.3) for the first word in the sub-sentence, selecting a word combination of a first number of words starting with the first word to be used as a phrase when a ratio of the occurrence of the word combination of the first number of words starting with the first word and continuing with adjacent words in the sub-sentence to occurrence of a word combination of the first number of words starting with the word immediately following the first word and continuing with adjacent words in the sub-sentence is greater than that for any but the first number, provided the first number is less than a predetermine threshold.

5. A method as in claim 4 wherein step (b) additionally includes the following substeps:
   (b.4) for a next word in the sub-sentence not included in the word combination of the first number of words starting with the first word, determining an occurrence, in the corpus, of word combinations of the sub-sentence beginning with the next word;
   (b.5) for a word immediately following the next word in the sub-sentence, determining an occurrence, in the corpus, of word combinations of the sub-sentence beginning with the word immediately following the next word; and,
   (b.6) for the next word, selecting a word combination of a second number of words starting with the next word to be used as a phrase when a ratio of the occurrence of the word combination of the second number of words starting with the next word and continuing with adjacent words in the sub-sentence to occurrence of a word combination of the second number of words starting with the word immediately following the next word and continuing with adjacent words in the sub-sentence is greater than that for any but the second number, provided the second number is less than the predetermine threshold.

6. A method for automating the process of dividing sentences into sub-sentences comprising the following steps:

(a) for each pair of adjacent words in the sentence calculating a metric $$FE(C_i) = -\sum_{C_j} P_F(C_j \mid C_i) \log P_F(C_j \mid C_i)$$

which represents a strength of disconnection between the adjacent words; and (b) breaking the sentence into sub-sentences at locations in the sentence where the metric exceeds a first threshold;

wherein in step (a), the metric is a curability measure that is calculated as a sum of backward entropy, forward entropy and mutual information; and, wherein in step (a) forward entropy (FE) of a character $C_I$ which immediately proceeds a character $C_j$ in a sentence is calculated using the following equation:

where $P_F(C_j|C_i)$ is the probability of $C_j$ following $C_j$.

7. A method for automating the process of dividing sentences into sub-sentences comprising the following steps:

(a) for each pair of adjacent words in the sentence calculating a metric which represents a strength of disconnection between the adjacent words; and (b) breaking the sentence into sub-sentences at locations in the sentence where the metric exceed a first threshold;

wherein in step (a), the metric is a cutability measure that is calculated as a sum of backward entropy, forward entropy and mutual information; and, wherein in step (a) backward entropy (BE) of a character $C_I$ which immediately follows a character $C_j$ in a sentence is calculated using the following equation:

$$BE(C_i) = -\sum_{C_j} P_B(C_j \mid C_i) \log P_B(C_j \mid C_i)$$

where $P_B(C_j|C_i)$ is the probability of $C_j$ being ahead of $C_j$.

8. A method for automating the process of dividing sentences into sub-sentences comprising the following steps:

(a) for each pair of adjacent words in the sentence calculating a metric $$MI(C_i, C_j) = \log \frac{P(C_i C_j)}{P(C_i) P(C_j)}$$

which represents a strength of disconnection between the adjacent words; and (b) breaking the sentence into sub-sentences at locations in the sentence where the metric exceeds a first threshold;

wherein in step (a), the metric is a curability measure that is calculated as a sum of backward entropy, forward entropy and mutual information; and, wherein in step (a) mutual information (MI) of a character $C_I$ which immediately precedes a character $C_j$ in a sentence is calculated using the following equation;

where $P(C_iC_j)$ is the probability that $C_j$ exactly comes after $C_i$, where $P(C_i)$ is the probability that any character chosen at random in the corpus is $C_i$, and where $P(C_j)$ is the probability that any character chosen at random in the corpus is $C_j$.

9. A method for automating the process of dividing a sentence portion into phrases, comprising the following steps:

(a) for a first word in the sentence portion, determining an occurrence, in a corpus, of word combinations of the sentence portion beginning with the first word;

(b) for a word immediately following the first word in the sentence portion, determining an occurrence, in the corpus, of word combinations of the sentence portion beginning with the word immediately following the first word; and, (c) for the first word in the sentence portion, selecting a word combination of a first number of words starting with the first word to be used as a phrase when a ratio of the occurrence of the word combination of the first number of words starting with the first word and continuing with adjacent words in the sentence portion to occurrence of a word combination of the first number of words starting with the word immediately following the first word and continuing with adjacent words in the sentence portion is greater than that for any but the first number, provided the first number is less than a predetermine threshold.

10. A method as in claim 9 additionally comprising the following steps:

(d) for a next word in the sentence portion not included in the word combination of the first number of words starting with the first word, determining an occurrence, in the corpus, of word combinations of the sentence portion beginning with the next word;

(e) for a word immediately following the next word in the sentence portion, determining an occurrence, in the corpus, of word combinations of the sentence portion beginning with the word immediately following the next word; and, (f) for the next word, selecting a word combination of a second number of words starting with the next word to be used as a phrase when a ratio of the occurrence of the word combination of the second number of words starting with the next word and continuing with adjacent words in the sentence portion to occurrence of a word combination of the second number of words starting with the word immediately following the next word and continuing with adjacent words in the sentence portion is greater than that for any but the second number, provided the second number is less than the predetermine threshold.

* * * * *